United States Patent
Kulig et al.

(10) Patent No.: US 6,825,584 B2
(45) Date of Patent: Nov. 30, 2004

(54) HIGH-VOLTAGE ELECTRIC ROTARY MACHINE AND A METHOD FOR COOLING THE CONDUCTORS OF SAID MACHINE

(75) Inventors: Stefan Kulig, Oberhausen (DE); Dirk Peier, Dortmund (DE); Klaus Sedlazeck, Mülheim (DE)

(73) Assignee: Voith Siemens Hydro Power Generation GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/204,820

(22) PCT Filed: Feb. 10, 2001

(86) PCT No.: PCT/EP01/01471

§ 371 (c)(1),
(2), (4) Date: Mar. 21, 2003

(87) PCT Pub. No.: WO01/63725

PCT Pub. Date: Aug. 30, 2001

(65) Prior Publication Data

US 2003/0164248 A1 Sep. 4, 2003

(30) Foreign Application Priority Data

Feb. 25, 2000 (EP) ............................................. 10008807

(51) Int. Cl.[7] .............................. H02K 1/16; H02K 3/24
(52) U.S. Cl. ............................ 310/52; 310/55; 310/254
(58) Field of Search ............................... 310/52, 54, 55, 310/187, 254, 58–59

(56) References Cited

U.S. PATENT DOCUMENTS

| | | | | |
|---|---|---|---|---|
| 2,975,309 A | * | 3/1961 | Seidner | 310/54 |
| 4,217,511 A | * | 8/1980 | King et al. | 310/55 |
| 4,323,802 A | * | 4/1982 | Leistner | 310/59 |
| 4,333,027 A | | 6/1982 | Madsen | 310/61 |
| 4,994,700 A | * | 2/1991 | Bansal et al. | 310/215 |
| 5,866,959 A | * | 2/1999 | Le Flem | 310/51 |

FOREIGN PATENT DOCUMENTS

| | | | | |
|---|---|---|---|---|
| DE | 2 356 673 | | 6/1974 | H02K/3/24 |
| DE | 196 21 058 | | 11/1997 | H02K/3/24 |
| EP | 342554 | * | 11/1989 | H02K/3/24 |
| EP | 0 493 704 | | 7/1992 | H02K/5/132 |
| GB | 468827 | * | 7/1937 | |
| GB | 1 446 764 | | 8/1976 | H02K/3/04 |
| WO | WO 97/45914 | | 12/1997 | H02K/1/20 |

* cited by examiner

*Primary Examiner*—Burton Mullins
(74) *Attorney, Agent, or Firm*—Baker & Daniels

(57) ABSTRACT

The aim of the invention is to ensure efficient coolilng in an electric rotary machine (2), in particular in a high-voltage generator. To achieve this, the invention provides a coolant channel (10) which extends in a radial direction and in which a number of high-voltage conductors (14) are located. A coolant gas is preferably used as the coolant. The advantage of positioning the high-voltage cables (14) in the coolant channels (10) is that the coolant comes into direct contact with said high-voltage cables (14), thus ensuring efficient and uniform cooling.

9 Claims, 2 Drawing Sheets

HIGH-VOLTAGE ELECTRIC ROTARY MACHINE AND A METHOD FOR COOLING THE CONDUCTORS OF SAID MACHINE

BACKGROUND OF THE INVENTION

The invention concerns an electric rotary machine, in particular a generator, with a stator and with a stator coil, which has a number of high-voltage cables. The invention also concerns a method for the cooling of such electric rotary machines.

Conventional electric rotary machines, for example, turbo-generators, are designed for a relatively low voltage of 10 . . . 25 kV. However, the rotary machine to which this invention refers is designed for high voltage. In this case, high voltage is understood to be the range from 30 kV to several 100 kV. Such a high-voltage generator is specially designed for the power supply of long-distance networks, for example, for 110 kV. The main advantage of the high-voltage generator is that it can feed power directly into the long-distance network, without needing a transformer.

An important difference between a conventional generator and the high-voltage generator consists in the design of its coil, in particular, its stator coil. In particular, this concerns the individual cables, which, in the case of high-voltage generators, are designed as high-voltage cables. Based on the clearly higher voltages, these high-voltage cables must have a fundamentally different insulation than the cables of conventional generators. The high-voltage cables are similar to conventional high-voltage cables and, as a rule, have a bundle of cable lanes, which are covered by an appropriate insulation, specifically plastic insulation.

Based on the distinctly higher voltages, high-voltage generators demand a different construction with regard to electric/magnetic boundary conditions as well as with regard to the required cooling.

A cooling system for such a high-voltage generator is known from WO 97/45914. The stator of this generator is layered by individual segment-forming sheets of metal in the longitudinal direction such that extending grooves are formed in the radial direction. Several high-voltage cables, which are arranged next to each other in the radial direction, run in each of the grooves. The groove has a complex geometry; i.e., its sidewalls are formed by a stringing together of curvatures corresponding to the individual high-voltage cables. Cooling channels that extend in the axial direction are provided between every two such grooves. The actual cooling cable, with a coolant flowing through it, is fed through the corresponding cooling channel. This arrangement requires an embedded material for the cooling cable, in order to achieve a good thermal contact between the cooling cable and the corresponding tooth-like stator segment.

SUMMARY OF THE INVENTION

The invention is based on the function of guaranteeing an efficient cooling for a high-voltage generator.

In accordance with the invention, this function is fulfilled by an electric rotary machine, in particular by a generator, with a stator and a stator coil, which has a number of high-voltage cables, whereby a coolant channel is provided, in which a number of the high-voltage cables are arranged.

An immediate cooling of the individual high-voltage cables is enabled by the arrangement of the high-voltage cables in the coolant channel. The heat is diverted directly by a coolant flowing through the coolant channel. Thus, there are no other components arranged between the coolant and the high-voltage cables that impair the thermal conductibility and thereby the cooling capacity.

The arrangement of the high-voltage cables in the coolant channel is thus comparable to the known state-of-the-art arrangement in a groove of the stator, with the important difference that, with the known generator, the high-voltage cables are cooled only indirectly. The groove is brought in as the coolant channel. The high-voltage cables thereby extend preferably in the axial or longitudinal direction of the generator and are arranged next to each other in the radial direction in the coolant channel.

For a simple construction of the stator, this is preferably separated into stator segments that form a circular ring as seen from the cross-section, whereby each stator segment has at least one coolant channel, in which several high-voltage cables are arranged. Through the arrangement of the coolant channels in each individual segment, an efficient and even cooling is realized.

The coolant channel is preferably designed as a cool gas channel; i.e., the cooling takes place, for example, via air or, in particular, with turbo-generators also via hydrogen. Compared to an oil-cooled generator, such a gas-cooled generator has advantages with respect to the coolant circulation method.

In order to achieve a particularly simple constructive arrangement, a preferred design form of the coolant channel has a rectangular cross-sectional geometry.

In order to effectively use the room available within the stator, the coolant channel extends outward preferably in the radial direction. In terms of a simple design, this take place in stages.

This advantageously enables, with the increasing width of the coolant channel, an increase in the number of high-voltage cables arranged next to each other in a direction perpendicular to the radial direction.

In accordance with the invention, this function is also fulfilled by a procedure for cooling an electric rotary machine, in particular, for cooling a generator, whereby the rotary machine has a stator with a stator winding, which comprises a number of high-voltage cables, and whereby the high-voltage cables are cooled immediately by a coolant.

This procedure advantageously uses the channel, in which the high-voltage cables run, as the guide for a coolant. An immediate, efficient, and even generator cooling is thus guaranteed.

The advantages mentioned with respect to the rotary machine and preferred design forms are present in the method in an analogous fashion.

BRIEF DESCRIPTION OF THE DRAWINGS

Design examples of the invention will be described in more detail below using the drawing. Each of the following is shown in very simplified figures.

DETAILED DESCRIPTION

Figure 1:
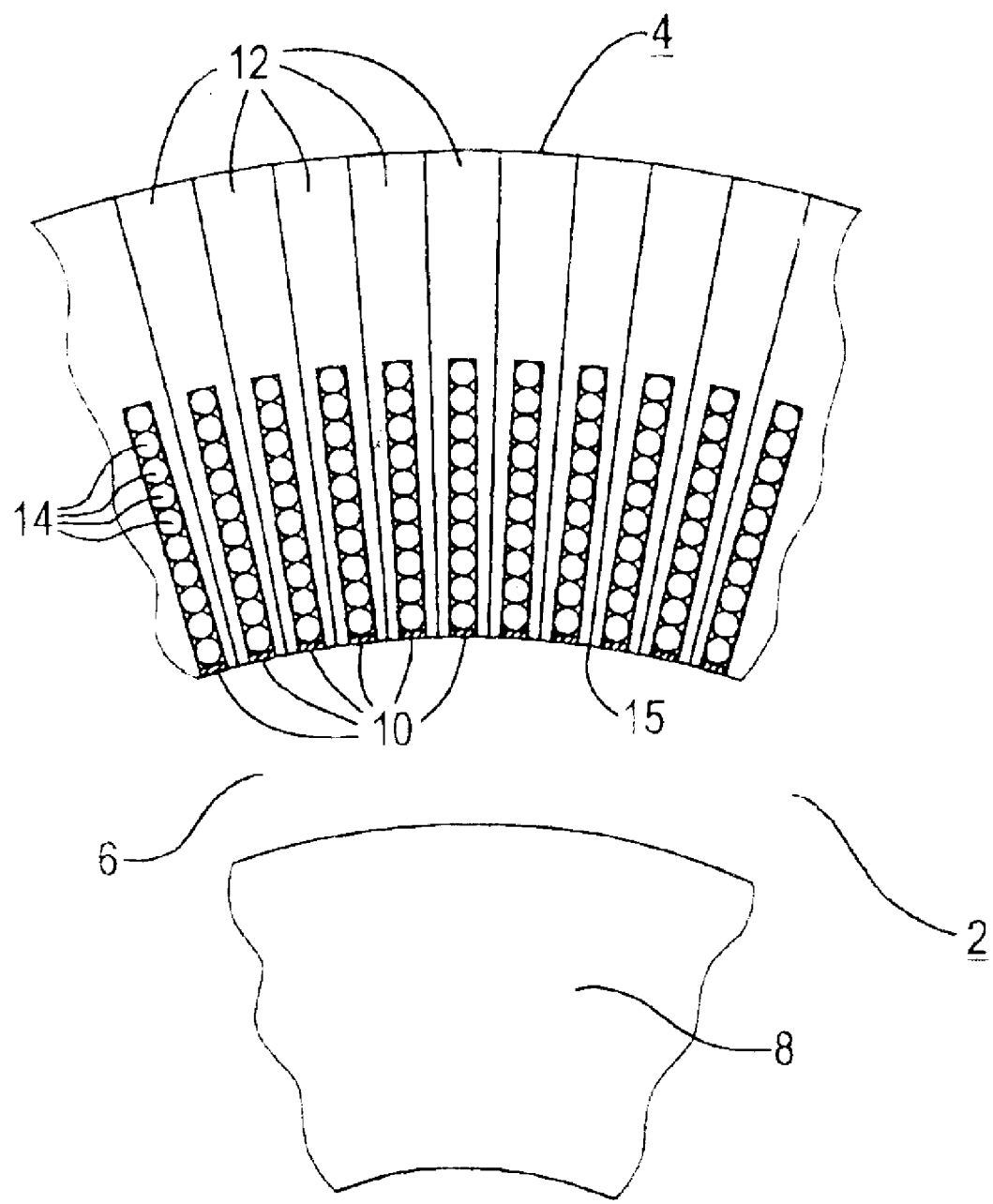
FIG. 1 a sector from a cross-section through a generator.

In accordance with the cut-out, segment-like representation of a cross-section through a generator 2 designed as a high-voltage generator based on FIG. 1, a generator 2 has a stator 4, which surrounds a rotor 8 in circular-ring form upon the formation of an air gap 6. The stator 4 has a number of grooves that are designed as coolant channels 10. These run in the longitudinal direction of generator 2; i.e., they run perpendicular to the plane of the paper and each extends out in the radial direction.

Each of the coolant channels 10 is arranged within a stator segment 12. The individual stator segments 12 have an essentially trapezoid-like cross-sectional surface. The individual stator segments 12 form tie ring-shaped stator 4.

A number of high-voltage cables 14 are arranged within each of the coolant channels 10. These run in the longitudinal direction of generator 2 through stator 4 and are arranged next to each other in the radial direction within the coolant channels 10. The high-voltage channels 14 thus form a row within a coolant channel 10 and release gusset-shaped cross-sections.

The coolant channels 10 and the rows of high-voltage cables 14 extend out beginning from the rotor-side interior 15 in the radial direction. The high-voltage cables 14 form the coil of stator 4.

For cooling of the high-voltage cables 14, a coolant, in particular a cool gas, is fed through each of the coolant channels 10. The coolant is thus in immediate contact with the outer surface of the high-voltage cables 14 and causes an efficient and, above all, uniform cooling of the individual cables. As additional cooling, further cooling cables known from the state-of-the-art can be used to cool the stator 4. These are, for example, arranged between the individual coolant channels 10 as well as in the radial direction on the coolant channels.

As opposed to the known structure of a high-voltage generator, where high-voltage cables 14 are arranged in grooves open to air gap 6, the individual coolant channels 10, based on the design in FIG. 1, are locked on the interior side 15 in order to enable targeted coolant guiding. Coolant channels 10, in particular, are locked tightly by blocks 17, as can be seen in FIG. 2 and FIG. 3.

The complex state-of-the-art geometry with the arched sidewalls is also taken into consideration for coolant channels 10. However, the design with the rectangular cross-section surface in accordance with FIG. 1 advantageously allows easier production as well as a comparably easy calculation of the appearing magnetic and/or electric fields.

The advantages of the arrangement of the high-voltage cables 14 in coolant channels 10 or the advantages of the design of the known grooves as coolant channels 10 are as follows: additional cooling cables can be foregone due to the efficient cooling. In particular, gas cooling is sufficient and, thus, a liquid coolant, like water or oil, is not necessary. Secure and easy cooling is also guaranteed through the direct contact of the coolant on the cable surface. Additionally, the free space between the individual high-voltage cables 14 is used efficiently. The design of coolant cables 10 as rectangular channels advantageously provides a comparably large streaming cross-section, so that a high cool gas rate is attainable.

Figure 2:
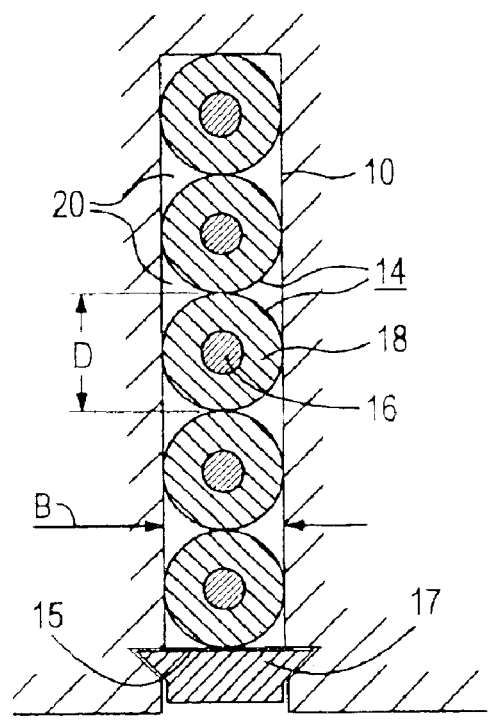
FIG. 2 a coolant channel with a rectangular cross-section and with internal high-voltage cables and FIG. 3 a coolant channel with a stepwise expanding cross-section.
Figure 3:
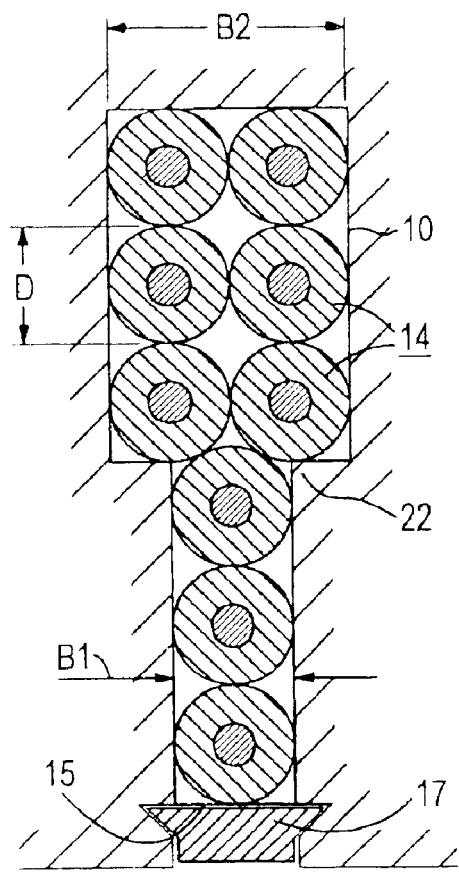

In accordance with the enlarged figure of an individual coolant channel 10 as in FIG. 2, width B of the coolant channel is adjusted to diameter D of the individual high-voltage cables 14. The high-voltage cables 14 have an interior core 16, which is preferably formed from a bundle of individual cable lines. Core 16 is surrounded by insulation 18, which is preferably a common plastic insulation for high-voltage cables. The individual high-voltage cables 14 lie directly next to each within coolant channel 10. Between them and coolant channel 10, individual hollow spaces 20 are formed, through which the coolant flows perpendicular to the lane of the paper.

In accordance with FIG. 3, coolant channel 10 is formed so as to expand stepwise as it extends outward starting from its inner rotor side 16 in the radial direction upon the formation of a step 22. Width B1 of coolant channel 10 below step 22 is fitted to diameter D of high-voltage cable 14 and width B2 above step 22 is fitted to doubled diameter D so that two high-voltage cables 14 can be arranged next to each other in a direction perpendicular to the radial direction in coolant channel 10. This design, which extends in the radial direction, of coolant channel 10 guarantees the efficient use of space in stator 4. Instead of the step-like design of the consistent diameter D of high-voltage cable 14, an alternative space usage design can also be realized in that coolant channel 10 constantly opens and in that, in particular, diameter D of the individual high-voltage cables 14 increases at the same time.

Within the groove developed as coolant channel 10, the high-voltage cables are determined preferably with holding elements, e.g., with clamps and with tongue elements (not shown), in order to prevent the relative movement of high-voltage cables 14 with respect to each other and with respect to the stator body as a result of forces affecting them or as a result of vibrations.

What is claimed is:

1. A high voltage generator for voltages of at least 30 kV, comprising: a stator including a stator coil comprising a plurality of high voltage cables, said stator including a coolant channel in which a plurality of the cables are disposed, said coolant channel expanding stepwise in the radial direction such that with increasing width of the coolant channel the number of high voltage cables arranged next to each other in a direction perpendicular to the radial direction increases.

2. The high voltage generator of claim 1 wherein said stator comprises a plurality of stator segments together forming a circular ring and wherein each of said segments has a said cooling channel in which a plurality of the high voltage cables are disposed.

3. The high voltage generator of claim 2 wherein said coolant channel is designed as a cool gas channel.

4. The high voltage generator of claim 1 wherein said coolant channel is designed as a cool gas channel.

5. The high voltage generator of claim 1 wherein said stator comprises a plurality of said coolant channels expanding stepwise in the radial direction such that with increasing width of the coolant channels the number of high voltage cables arranged next to each other in a direction perpendicular to the radial direction increases.

6. In a high voltage generator for voltages of at least 30 kV, such generator comprising: a stator comprising a stator coil comprising a plurality of high voltage cables, the stator further including a coolant channel in which a plurality of the cables are disposed, the coolant channel expanding stepwise in the radial direction such that with increasing width of the coolant channel the number of high voltage cables arranged next to each other in a direction perpendicular to the radial direction increases, a method for cooling the generator comprising flowing a coolant through the coolant channel to thereby directly cool the cables.

7. The method of claim 6 wherein the generator comprises a plurality of said channels, and flowing the coolant through said plurality of channels.

8. The method of claim 7 wherein the coolant that flows through the channels is a cool gas.

9. The method of claim 6 wherein the coolant that flows through the channel is a cool gas.

* * * * *